Nov. 11, 1958  H. R. BILLETER  2,859,699
ROTARY POSITIVE DISPLACEMENT DEVICES
Filed March 12, 1956  4 Sheets-Sheet 1

INVENTOR.
HENRY ROBERT BILLETER
BY
ATTORNEYS

Nov. 11, 1958 H. R. BILLETER 2,859,699
ROTARY POSITIVE DISPLACEMENT DEVICES
Filed March 12, 1956 4 Sheets-Sheet 2

INVENTOR.
HENRY ROBERT BILLETER
BY
ATTORNEYS

Nov. 11, 1958     H. R. BILLETER     2,859,699
ROTARY POSITIVE DISPLACEMENT DEVICES
Filed March 12, 1956     4 Sheets-Sheet 3

INVENTOR.
HENRY ROBERT BILLETER
BY
ATTORNEYS

Nov. 11, 1958  H. R. BILLETER  2,859,699
ROTARY POSITIVE DISPLACEMENT DEVICES
Filed March 12, 1956  4 Sheets-Sheet 4

INVENTOR.
HENRY ROBERT BILLETER
BY
Fidler, Crowe & Beardsley
ATTORNEYS

United States Patent Office 2,859,699
Patented Nov. 11, 1958

2,859,699

ROTARY POSITIVE DISPLACEMENT DEVICES

Henry Robert Billeter, Deerfield, Ill., assignor, by mesne assignments, to Liquid Controls Corporation, North Chicago, Ill., a corporation of Illinois Application March 12, 1956, Serial No. 570,993

13 Claims. (Cl. 103—125)

This invention relates to rotary, positive displacement devices for liquids and has to do more particularly with such a device which is especially well adapted for use as a meter for measuring liquid flow. The device also may be used as a pump, motor, compressor, or blower.

In devices of the rotary positive displacement type a plurality of displacement rotors are provided each of which sweeps in sealing relation with a cylindrically arcuate portion of the wall of the displacement chamber during the displacement or "working" portion of the rotation. A blocking rotor is provided which sweeps in sealing relation with another wall portion of the casing and also with the displacement rotors to prevent by-passing of the liquid around the displacement rotors. Such a device is subject to the disadvantage that when fluid is caused to flow through the device the pressure of the fluid distorts the casing walls with the result that there is leakage past the seals between the moving and stationary elements.

An object of the present invention is to provide a rotary, positive displacement device for liquids wherein the sealing relation between the several rotary and fixed elements is maintained constant, regardless of the pressure of the fluid in the device.

Another object is to provide a rotary, positive displacement device for liquids which when employed as a meter is extremely accurate.

Another object is to provide a rotary, positive displacement device for liquids wherein the stationary elements against which the rotors seal form a rigid assembly which is so mounted in the casing that liquid pressure stresses on such assembly are balanced and there is no distortion of the assembly.

Another object is to provide a rotary, positive displacement device for liquids wherein is provided a novel mounting means for the rotors.

Still another object is to provide a rotary, positive displacement device for liquids having a novel form of displacement rotor.

Still a further object is to provide a rotary, positive displacement device having a novel form of blocking wall construction for cooperating with the blocking rotor to prevent by-passing of the liquid past the displacement rotors.

A further object is to provide a novel gearing adapted to be immersed in a liquid wherein a minimum amount of work is required to cause the liquid to pass into and out of the tooth spaces.

Other objects and advantages of the invention will appear from the following description taken in connection with the appended drawings wherein.

For the purpose of illustrating my invention I have shown it in connection with a meter embodying the general principles of the meter disclosed and claimed in the co-pending application of George B. Richards Serial No. 522,930 filed July 19, 1955, although it will be understood that the invention is not thus limited but is applicable to other rotary, positive displacement devices for liquids wherein a blocking rotor and one or more displacement rotors cooperating therewith are disposed in a chamber provided by a casing or housing.

Figure 1:
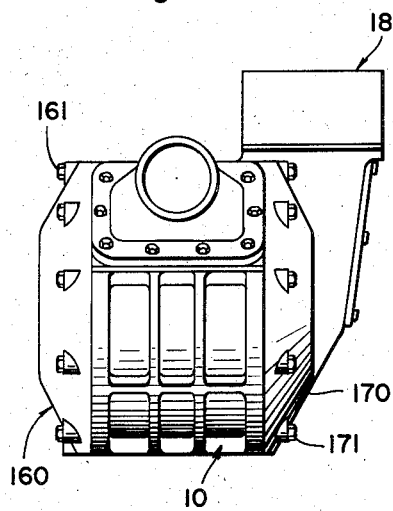
Figure 1 is a side elevational view of a meter embodying my invention.
Figure 2:
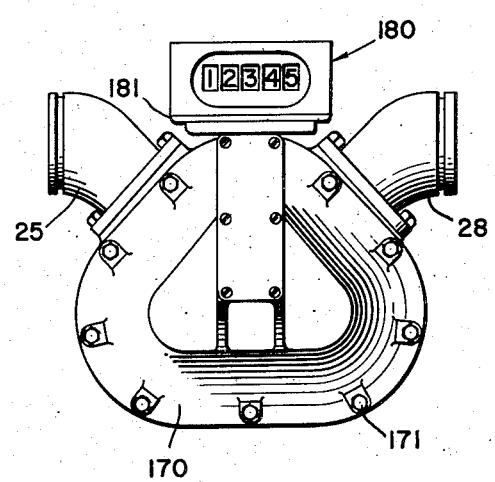
Fig. 2 is a front elevational view of the meter of Fig. 1.
Figure 4:
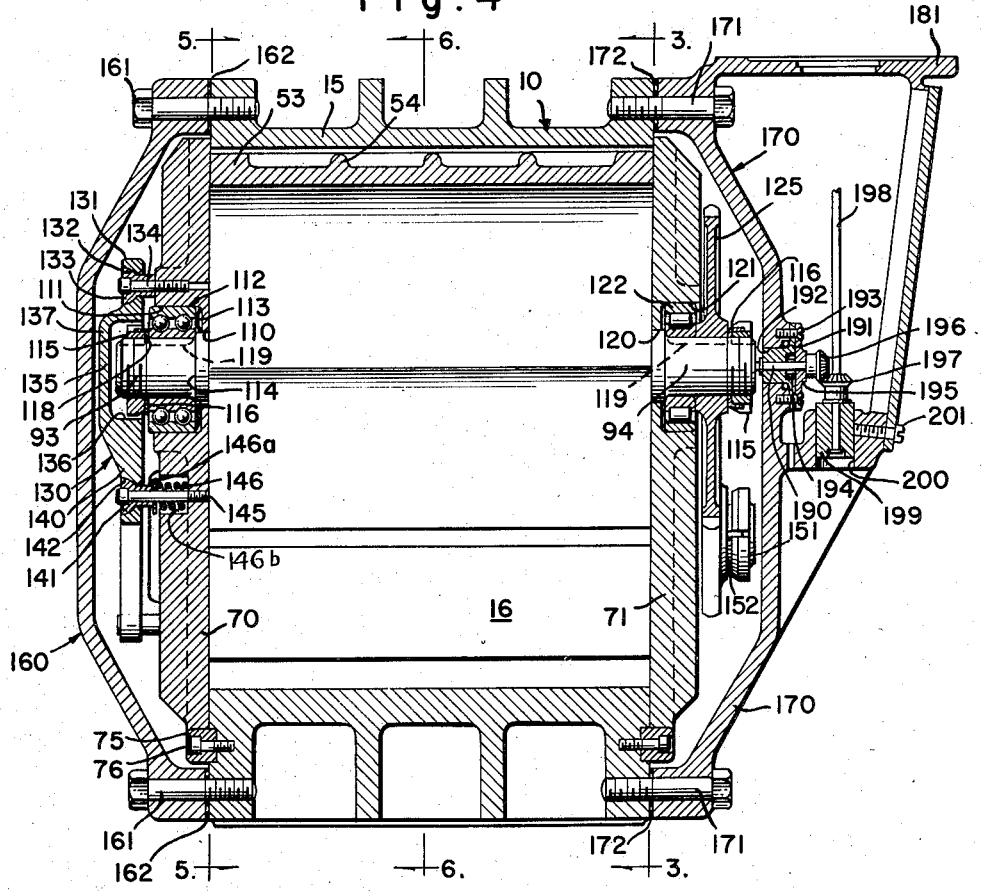
Fig. 4 is a vertical sectional view taken medially through the meter of Fig. 2, with the counter removed.
Figure 7:
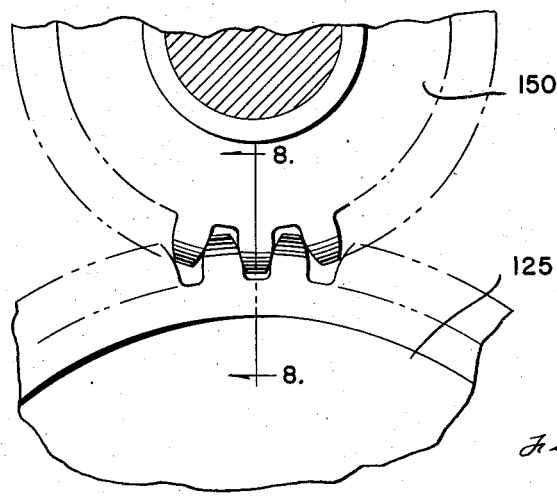
Fig. 7 is a fragmentary, enlarged side elevational view of gearing forming a part of the present invention.

Referring now particularly to Figs. 1, 2 and 4 of the drawings the meter includes a casing 10 formed by a generally tubular casing member 15 providing a space or chamber 16 which, in the present embodiment, is of generally triangular or trefoil form, and is defined principally by two adjacent arcuate wall portions 17 and 18 and a third arcuate wall portion 19 generally opposite the portions 17 and 18. The casing 10 is provided with an inlet opening 22 and outlet opening 23 communicating respectively with the chamber 16.

Secured to the body member 15 as by bolts 24 is inlet member or spool 25 having a passage 26 extending therethrough and in registry with the inlet opening 22. An outlet member or spool 28 similar to the inlet member 25 is secured to the casing member 15, with the passage 29 in registry with the outlet opening 23. Sealing gaskets 27 are clamped between the casing 10 and the members 25 and 28. The inlet member 26 and the outlet member 28 are adapted for connecting the meter in a liquid line.

At this point is should be understood that the device of the present invention is completely reversible (upon appropriate connection of the counter, hereinafter described). Thus, where the terms "inlet" and "outlet" are used herein it will be understood that this is merely for convenience and clarity in description.

Rotatably mounted in the chamber 16 is an inlet displacement rotor 30, an outlet displacement rotor 31, and a blocking rotor 32. Each of the displacement rotors is positioned to rotate in sealing engagement through a portion of its rotation with a sealing surface (hereinafter described more in detail) defining a displacement rotor cavity and simultaneously in sealing engagement with a convex peripheral surface of the blocking rotor 32. The displacement rotors 30 and 31 and the blocking rotor 32 are so arranged that each displacement rotor is simultaneously in sealing relation with the corresponding sealing surface and with the blocking rotor and through one-half of its cycle and then is in spaced relation to the sealing surface and to the blocking rotor during the remainder of the cycle. The displacement rotors 30 and 31 pass through the displacement or working portions of their respective cycles alternately so that during the period that one of the displacement rotors is in sealing engagement with he corresponding sealing surface and the blocking rotor, the other displacement rotor is spaced from the sealing surface and the blocking rotor. The blocking rotor is positioned to pass in sealing engagement with a blocking surface so that it is always in sealing relation to such surface and thus prevents by-passing of liquids around the displacement rotors and accordingly insures that all of the liquid which passes through the device is displaced through the cavities in which the displacement rotors rotate, so as to displace such rotors and accurately measure the liquid.

The sealing surfaces with which the displacement rotors 30 and 31 pass in sealing relation are provided by shoes 40 and 41 respectively, only one of which will be described inasmuch as the shoes are similar in construction and function. The shoe 40 is of generally arcuate form and has an inner surface 42 of cylindrically arcuate shape, which in the present embodiment extends angularly throughout 180°. The shoe 40 extends throughout the length of the chamber 16 and abuts the end walls thereof in tight sealing relation. At its outer portion the shoe 40 is spaced from the corresponding wall portion 17 of the tubular casing member 15 to provide a space 44 which communicates with the interior of the chamber 16 for a purpose hereinafter explained. A similar space 49 is provided between the shoe 41 and the wall portion 18.

The shoe 40 is formed with a cylindrically arcuate wall portion 45 having peripherally extending end flanges (not shown) and a plurality of ribs 47 similar to the end flanges and located intermediate and parallel to the latter. A longitudinally extending rib 48 is provided which extends throughout the length of the shoe 40 at its midpoint for a purpose hereinafter explained.

A third shoe 50 is provided which serves as a blocking wall portion for the blocking rotor 32 as hereinafter explained. The shoe 50 is of cylindrically arcuate form but extends through an angular extent of approximately 90°. The shoe 50 is generally similar in form to the shoe 40 but is of lesser angular extent. It has a generally arcuate wall portion 51 providing cylindrically arcuate surface 52 and end flanges 53 (Fig. 4) which extend throughout its peripheral length and intermediate ribs 54 which extend peripherally in parallel, spaced relation to the end flanges 53. It also is provided with a central, longitudinal rib 55 corresponding to the rib 48 of the shoe 40.

The shoe 50 is spaced from the corresponding wall of the casing 15 to provide a space 56 for a purpose hereinafter explained.

The arcuate surface 52 of the shoe 50 serves merely as a blocking surface and is not positioned to be in sealing relation with the periphery of the blocking rotor 32. Instead I provide at each end of the shoe 50 a rotor sealing member 60 which takes the form of a bar and is secured, as by screws 61, to the end face of the shoe 50 in position to project radially inwardly a slight distance beyond the arcuate face 52 of the shoe 50. The rotor seals 60 are positioned to be engaged by the sealing surfaces of the blocking rotor 32 as the latter is rotated and thus prevent the passage of liquid from the inlet to the outlet through the space between the axis of the blocking rotor 32 and the shoe 50.

Figure 3:
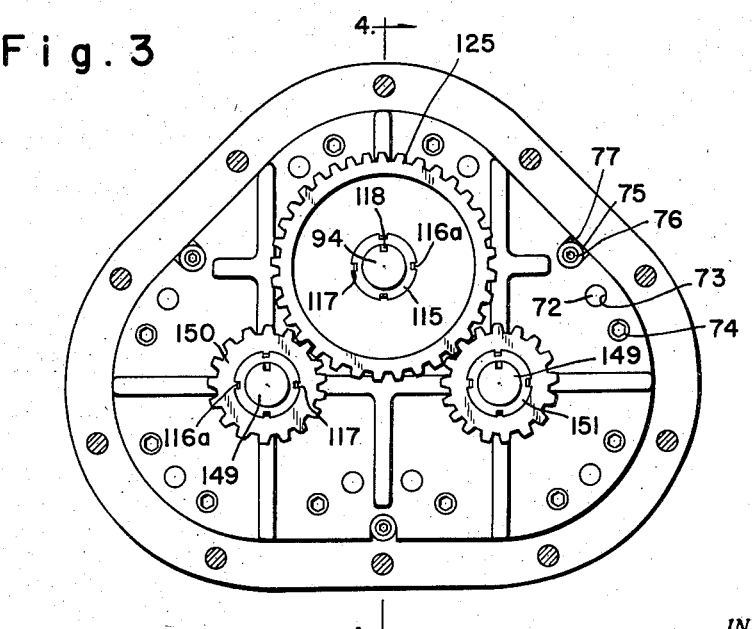
Fig. 3 is a somewhat enlarged, sectional view of the meter taken along line 3—3 of Fig. 4.

The three shoes 40, 41 and 50 are secured in appropriate relative positions by end plates 70 and 71. Each shoe is positioned relatively to the end plates by a plurality of dowel pins 72 (Fig. 3) projecting from the ends of the shoes and through openings 73 in the two end plates 70 and 71 respectively which are dimensioned to provide a close, sliding fit for the dowel pins 72. Thus the shoes are securely and rigidly supported accurately in their proper positions by the end plates. In order to maintain the end plates against the ends of the shoes and to prevent longitudinal displacement of the end plates relative to the shoes a plurality of screws 74 are provided which extend through the end plates and are threaded into the ends of the several shoes. Thus, there is provided a rigid assembly which includes the three shoes 40, 41 and 50 and the two end plates 70 and 71 and which for convenience I designate as the "shoe-and-end-plate" assembly.

The shoe-and-end-plate assembly is disposed in the tubular casing member 15 with the end plates 70 and 71 closing the end of the tubular casing member, as seen particularly in Fig. 4 of the drawings. The assembly is positioned in the casing member 15 by a plurality of (preferably three) guide pins 75 secured to the end edges of the casing member 15, as by screws 76. The end plates 70 and 71 are provided with notches 77 (Fig. 3) which receive the guide pins 75 and thus locate the assembly in the casing member 15.

When the shoe-and-end-plate assembly is disposed in the tubular casing member 15 the several shoes 40, 41 and 50 are spaced from the corresponding arcuate wall portions 17, 18 and 19 to provide the three spaces 44, 49 and 56 above mentioned. Liquid can thus flow from the chamber 16 into such spaces by passing between the edges of the respective shoes and the adjacent portion of the casing. It is essential however that such spaces do not serve to provide by-passes around the displacement rotors and past the blocking rotor to permit liquids to flow through such spaces from the inlet to the outlet of the device. Accordingly, I provide blocking means which prevent such flow through the spaces but which permit the spaces to remain filled with liquid at all times so that the shoes perform their intended function hereinafter explained.

Figure 6:
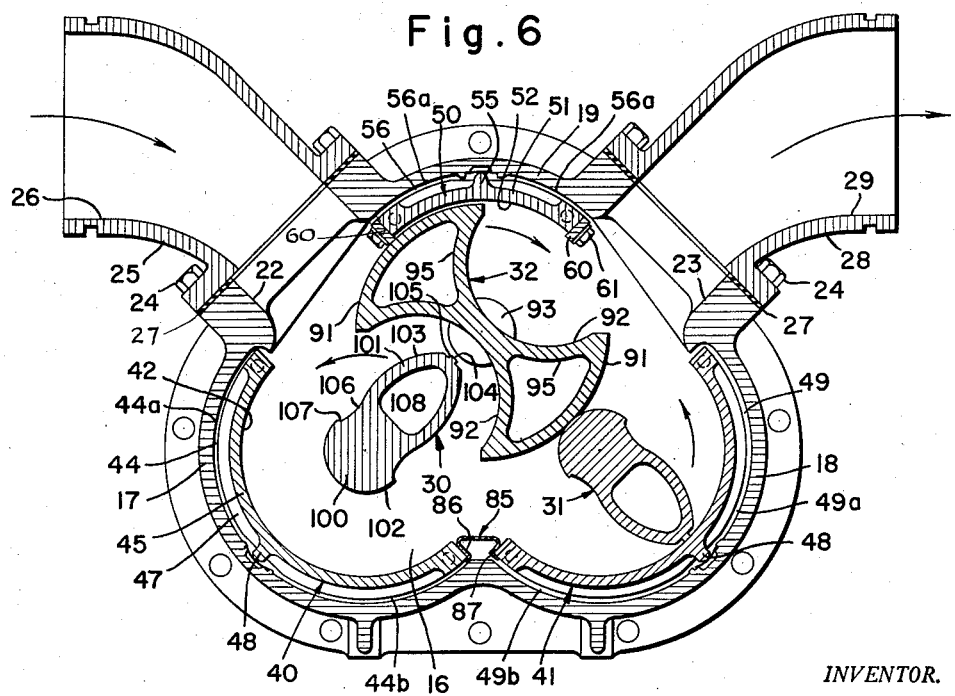
Fig. 6 is a transverse sectional view taken along line 6—6 of Fig. 4.
Figure 10:
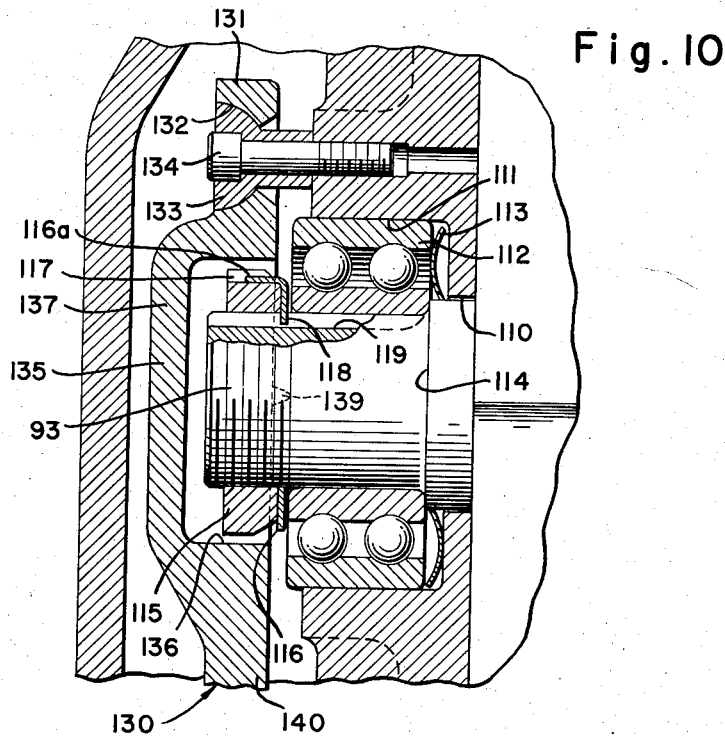
Fig. 10 is an enlarged view of a detail of Fig. 4.
Figure 9:
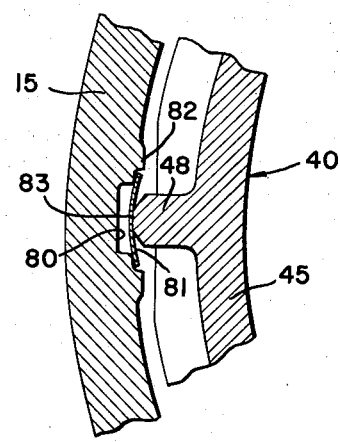
Fig. 9 is an enlarged view of a detail of Fig. 6.

The foregoing blocking action is provided by a seal including the ribs 48, 48 and the rib 55 and sealing members, now to be described cooperating therewith. Since each of the seals is the same only one will be described in detail. A longitudinally extending groove 80 (Figs. 6 and 9) is formed in the casing member 15 opposite the rib 48 and a spring 81 is disposed over the groove 80 and held against displacement by a pair of ribs 82 extending parallel to the groove 80 and spaced laterally therefrom a sufficient distance to provide a seat for the spring 81. The rib 48 is so dimensioned that it bears against and slightly bows the spring 81 to provide a liquid tight seal between the rib 48 and the spring 81. Preferably the face of the rib 48 which engages the spring 81 is bevelled as shown to provide a relatively narrow contacting surface 83. The arrangement is such that the groove permits the spring 81 to be bowed by the rib 48 and into the groove 80 so that the spring 81 is free to bend under the force exerted by the rib 48 whereby a liquid-tight seal is maintained.

Thus it will be seen that a seal is provided which extends throughout the length of the shoe 40 and which prevents passage of liquid between portion 44a on one side of the seal and 44b on the other side of the seal.

A similar spring seal arrangement is provided in connection with the rib 48 of the shoe 41 whereby to prevent passage of liquids from the portion 49a of the space 49 to the portion 49b.

The spaces 44b and 49b communicate at their inner ends with the chamber 16 and hence liquid can flow into such spaces.

For the purpose of providing a streamlined flow of liquid between the inlet displacement cavity and the outlet displacement cavity and to prevent turbulence I provide a fairing element 85 which takes the form of an elongated thin metal member of U-shaped cross-section having resilient flanges 86 having out-turned edges 87 adapted to clip over the inner ends of the shoes 40 and 41 to retain the member 85 in place. The fairing element 85 extends throughout the length of the shoes 40 and 41 and closes the space between the ends of these shoes. The fit between this member and the shoes is relatively loose and it does not prevent passage of liquid from the chamber 16 into the spaces 44b and 49b.

A third seal is provided in part by the rib 55 which is similar to the seal provided in connection with the rib 48 hereinbefore particularly described. The third seal with the rib 55 prevents any flow of liquid between the two portions of the space 56 namely 56a and 56b and thus prevents flow of liquid from the inlet to the outlet through the space 56 behind the shoe 50.

It will now be seen that liquid may enter the spaces 44a, 49a, 56a and 56b from the chamber 16 through the space or clearance between the ends of the shoes 40, 41 and 50 and the adjacent wall portions of the casing. Liquid enters the spaces 44b, 49b by passing between the fairing member 85 and the shoes, since these members are not in sealing engagement; also liquid passes between the ends of the member 85 and the casing end walls 70 and 71.

The blocking rotor 32 (Fig. 6) is disposed in the chamber 16 in a position concentrically with the shoe 50. The blocking rotor 32 is of overall cylindrical shape and is formed with two diametrically opposed convex, cylindrically arcuate, sealing portions 91 on its periphery concentric with the center of the rotor and two diametrically opposed concave arcuate portions 92 providing recesses in the rotor intermediate the peripheral sealing portions 91. For a purpose which will hereinafter appear, the peripheral portions 91 and the recesses or concave portions 92 each extend through 90° peripheral extent.

The blocking rotor 32 includes hub portions 93 and 94 (Fig. 4) respectively which are journaled in the end plates 70 and 71 in a manner hereinafter described.

The blocking rotor 32 is of such size that when it is rotated the convex peripheral portions 91, 91 sweep in close proximity to the sealing edges of the sealing members 60 the spacing between such surfaces being so slight that a liquid seal is provided therebetween. The angular extent of the blocking surface, that is the angular extent from the extreme outer portion of the face of one of the sealing members 60 to the corresponding outer face of the other, is at least as great as and preferably slightly greater than the peripheral extent of each of the recesses provided by the surfaces 92 in the blocking rotor 32 so that there is a seal between the blocking rotor and the blocking surface at all times. The blocking rotor thus prevents any bypassing of liquids from the inlet port to the blocking rotor recess to the outlet port. For the purpose of enhancing the sealing effect the convex peripheral portions of the blocking rotor are provided with very minute serrations (not shown) extending parallel to the axis of the rotor which serrations form a labyrinthine seal with the end surfaces of the sealing members 60. That is to say that when the rotor is rotated the serrations cause such turbulence in the liquids present in the slight space between the blocking rotor and the sealing members as to prevent any substantial flow of liquid between such surfaces.

The end edges of the blocking rotor 32 which seal against the end walls 70 and 71 similarly may be provided with serrations forming labyrinthine seals with the end walls.

The rotor 32 preferably is formed of hollow construction and is provided with open ended chambers 95 which construction serves to reduce the weight and consequently the inertia of the rotor. The open ended chambers 95 are in communication with the chamber 16 through the capillary seals and consequently are filled with liquid at all times. Thus there is no pressure differential between the exterior of the blocking rotor and the pressure of the liquid is uniform throughout the interior of the meter.

The two displacement rotors 30 and 31 are identical in construction and are so mounted and arranged as to cooperate with the respective portions of the blocking rotor 32 and with the casing member 15 and shoes 40 and 41 that they cooperate in a similar manner. Accordingly only one of the displacement rotors and its mounting arrangement will be described in detail.

The displacement rotor 30 includes a sealing portion 100 and a displacement portion 101 extending from the sealing portion. The sealing portion 100 is formed with a cylindrically arcuate convex surface 102 which is concentric about the axis of the displacement rotor 30. The sealing surface 102 is positioned to pass in sealing relation to the sealing surfaces 91 of the blocking rotor 32 as the rotors are rotated as hereinafter explained.

The displacement portion 101 of the displacement rotor 30 is provided with displacement surfaces 103 formed with major portions of convex, arcuate form generally converging in a direction away from the axis of rotation of the displacement rotor and a tip at the outer end of the displacement portion having a convex sealing surface 104 concentric with the axis of rotation of the displacement rotor. The sealing surfaces of the displacement rotor namely the surface 102 and the surface 104, as well as the end edges of the rotor which seal against the end plates 70 and 71 preferably are provided with serrations to provide labyrinthine seals similar to those above described. The displacement portion of the rotor 30 preferably is hollow, providing a chamber 108 open at its ends and communicating with the chamber 16 through the end seals and is at the same pressure as the liquid in the chamber 16.

The displacement rotor 30 is provided between the extreme outer end of each of the displacement surfaces 103 and the tip 104 with a notch 105 which construction aids in keeping any grit or other debris from entering the seal between the tip surface 104 and the sealing surface of the blocking rotor 32.

The displacement rotor 30 also is provided on each face with a clearance surface 106 of concave form which extends from the portion of maximum width of the displacement surface 103 to the corresponding end of the sealing surface 102. The clearance surfaces are spaced apart a lesser distance than the diameter of the sealing surface 102 and preferably diametrically extending shoulders 107 are provided at the ends of the clearance surfaces.

Each displacement rotor is formed with hubs or journal portions rotatably journaled in the end plates 70 and 71 respectively in a manner hereinafter explained.

The displacement rotor 30 is disposed to rotate about an axis concentrically with respect to the wall portion 42 so that the outer sealing edge or tip surface 104 sweeps along the wall in close proximity thereto but slightly spaced from. The sealing wall 42 has an angular extent of 180° and the outer end surface 104 is arranged to sweep in sealing relation with such surface through the entire angular extent thereof.

The arrangement is such that during the period that the tip surface 104 is passing in sealing relation to the cavity wall surface 42 the sealing surface 102 is in sealing relation with the convex surface 91 of the blocking rotor. The connection between the rotors (hereinafter explained) is such that the displacement rotor and the blocking rotor are in sealing relation during 180° movement of the displacement rotor, namely during the portion of its movement that the displacement rotor is in sealing engagement with the sealing surface 42 of the casing. At this point it should be noted that the sealing surface 102 is of cylindrically arcuate form and is concentric with the axis of rotation of the rotor and consequently is not acted on by any displacement force exerted by the liquid passing through the meter. On the other hand the clearance surface 106 and the displacement surface 103 are so positioned that the liquids passing through the meter exert a displacing force on such surfaces. The tip surface 104 is solely a sealing surface and since it is concentric with the axis of the displacement rotor there is no displacement force exerted thereon by the liquids.

The displacement rotor 30 is of such shape and dimension that it seals against the sealing surface 42 and simultaneously against the sealing surface 91 through 180° of its rotation and is spaced from both the surface 42 and the blocking rotor 32 during the remaining 180° of its rotation. The shape of the displacement rotor 30 is such that clearance is provided between it and the blocking rotor during the time that the former is passing through one or the other of the recesses in the blocking rotor. Moreover the clearance is such as not to trap liquids between the displacement rotor and the blocking rotor or cause any substantial turbulence in the liquid. To this end the entire face of the displacement portion 101 including the displacement surface 103 and the clearance surface 106 is smoothly curved and of a shape which might be termed "streamlined" shape. Thus as the displacement portion of the displacement rotor 30 passes through either of the recesses in the blocking rotor the liquid may flow substantially freely and without interference through the space between the blocking and displacement rotors without restriction. Moreover, the clearance between the displacement rotor and the surface 92 of the blocking rotor is made substantial so as to avoid any undue restriction on the flow of the liquid through such space. For example in the particular meter which I have selected as illustrative of the invention the clearance space is approximately 25% of the distance between the outer sealing surface 104 and the axis of rotation of the displacement rotor and may be as much as 50% of that distance.

The mounting of the several rotors in the end plates is similar in the case of each rotor and accordingly only one such mounting arrangement (that for the blocking rotor) will be described in detail.

The end plate 70 is formed with an opening 110 through which the rotor journal or hub portion 93 extends. The opening 110 is formed with an enlarged portion 111 forming a socket, in which is mounted a double row ball bearing 112, and a wavy spring washer 113 is interposed between the inner end of the bearing 112 and the bottom of the socket 111.

The ball bearing 112 fits snugly in the socket 111 but is sufficiently free that it may be displaced slightly in an axial direction for the purpose of permitting axial adjustment of the rotor, as hereinafter explained. The inner face of the inner race of the bearing 112 bears against a shoulder 114 formed on the hub whereby inward displacement (to the right as viewed in Fig. 4) effects a corresponding displacement of the rotor.

A nut 115 is threaded on the end of the hub or journal 93 and is secured thereon by a lock washer 116 having a plurality of tongues 116a one of which is bent over into one of four slots 117 formed in the head of the nut to lock the nut on the hub 93. The lock washer has an inwardly directed tongue 118 which is disposed in a keyway 119 formed in the hub thereby locking the lock washer and nut against rotation on the shaft. When the nut 115 is tightened on the hub 93 it acts through the lock washer 116 to clamp the bearing 112 against the shoulder 114.

The second end plate 71 is formed with an opening 120 through which the hub portion 94 projects which opening is provided with an enlarged portion 121 forming a socket in which is disposed a second bearing 122, preferably a roller bearing. The roller bearing 122 includes an inner race secured on the hub portion 94, a plurality of rollers disposed in a groove in the inner race and held against axial displacement relatively thereto and an outer race secured in the socket 121. The outer race is so formed that the rollers can move axially therein as well as roll.

It will now be seen that the arrangement of the bearings 112 and 122 is such that the assembly including the rotor 32, the entire ball bearing 112, and the inner race and rollers of the bearing 122, as well as the other members carried by the rotor 32 can be adjusted axially.

In lieu of the roller bearing 122 shown a "conrad" type ball bearing (not shown) may be used, with the outer race being seated in the socket 121 in such manner as to permit it to move axially.

At this point it should be noted that because of the double row construction of the ball bearing 112 no axial shifting will take place between the inner and outer races, even though wear occurs in the bearing and the rotor assembly will remain in the same position relatively to the outer race.

Mounted on the hub 94 is a driving gear 125 which is keyed to the hub 94 and prevented from angular movement thereon. The gear is secured against removal from the shaft by a nut 115 and lock washer 116 similar to the nut 115 and lock washer 116 previously described.

Means are provided for adjusting the position of the rotor in an axial direction within the end plates whereby the rotor may be positioned suitably within the end plate assembly to provide the desired clearance between the end walls of the rotor and the inner faces of the end walls of the casing.

To this end I provide a thrust plate 130 which is mounted on the end plate 70 and is adapted to engage the outer face of the outer race of the bearing 112 and retain the bearing and consequently the rotor against displacement under the urging of the spring 113. Moreover, the thrust plate 130 functions to position the rotor axially in a manner now to be explained.

The thrust plate 130 is of generally "paddle" form and includes an end portion 131 having an opening 132 extending therethrough and formed at its outer portion as a portion of a sphere to receive a bushing or washer 133 having a head portion complemental in shape to the spherical portion of the opening 132 to provide a universal seating for bushing in the opening. The thrust plate 130 is secured in position on the end plate 70 by a screw 134 extending through the bushing 133 and threaded into the end plate 70. Thus a "ball joint" is provided between the thrust plate 130 and the end plate 70. This arrangement permits the thrust plate 130 to be rocked about the bushing 133 relatively to the end plate 70.

The thrust plate 130 is formed with an enlarged, generally circular portion 135 having an opening 136 therein to receive the outer end of the hub 93 and the nut 115. Preferably a cupped cover portion 137 is provided over the opening 136 in order to provide the necessary stiffness and rigidity in the thrust plate 130. Projecting inwardly from the inner face of the circular portion 135 at diametrically opposite portions thereof are a pair of lugs 139 which bear against the outer face of the outer race of the ball bearing 112 and transmit the thrust of the thrust plate 130 to the outer race of the ball bearing.

Extending from the opposite side of the circular portion from the mounting portion 131 is a lever portion 140 having an opening 141 therein similar in shape to the opening 132 above described and receiving therein a spherical washer 142 similar to the washer 133 above described. A screw 145 extends through the washer 142 and is threaded into the end plate 70. The inner end of the bushing 142 is spaced from the end plate and does not abut the same so that the thrust plate 130 is not rigidly held against movement relatively to the end plate 70. The thrust plate 130 is yieldably urged outwardly by a spring 146 which surrounds the screw 145 and is compressed between the end plate 70 and a thrust washer 146a bearing against the inner end of the spherical bushing 142, the end plate being formed with a counterbore 146b which accommodates the spring 146 and screw 145.

It will be seen from the foregoing that the position of the rotor 32 between the side plates may be adjusted by tightening or loosening the screw 145. Thus, tightening of the screw 145 will draw the lever portion of the thrust plate 130 toward the end plate 70 and by reason of the engagement between the lugs 139, 139 and the bearing 112, the bearing and rotor 32 will be moved to the right (as viewed in Fig. 4). On the other hand loosening of the screw 145 allows the wavy washer 113 to move the bearing outwardly (to the left as viewed in Fig. 4). This outward movement of the bearing causes a corresponding movement of the rotor. The spring 146 which is compressed between the bushing 142 and the end plate 70 serves to take up any slack and provide additional friction to prevent the screw 145 from turning and getting out of adjustment.

From the foregoing it will be seen that the clearance between the ends of each rotor and the two end plates respectively may be readily adjusted by tightening of the respective screws 145.

Each of the displacement rotors 30 and 31 is mounted in the end plates 70 and 71 in a manner similar to that in which the blocking rotor is mounted and the displacement rotors therefore are adjustable within the end plates in the same manner as the blocking rotor. It should be noted however that the hubs 149 of the displacement rotors carry pinions 150 instead of a large gear such as a gear 125. Each of the pinions 150 is keyed to its corresponding shaft and is secured thereon by a nut 151 and lock washer 152 in a manner similar to that in which the gear 125 is secured in the shaft. The pinions 150 mesh with the gear 125 as seen particularly in Fig. 3 of the drawings.

The gear 125 and the pinions 150 serve as timing gears connecting together in driving relation the blocking rotor and the displacement rotors so that they rotate simultaneously and at predetermined angular velocities and are maintained in predetermined angular or phased relationship. The blocking rotor 32 is driven to rotate at a speed of one-half the speed of rotation of the displacement rotors 30 and 31 whereby each of the displacement rotors passes first in sealing engagement with one of the sealing surfaces of the blocking rotor and then through the following concave portion whereafter it passes in sealing relation with the second sealing surface and then in spaced relation to the second concave portion.

The members on the outer face of the end plate 70 are enclosed by a cover 160 which is secured to the casing member 15 by a series of screws 161, a gasket 162, being interposed between the cover 160 and the casing 15. The members carried on the end plate 71 are closed by a cover 170 secured to the casing by screws 171 and sealed by a gasket 172.

The bearings in the end plates may be lubricated by filling the spaces between the end covers and the end plates with a suitable liquid lubricant and maintaining a liquid pressure equal on both sides of the bearings.

A counter 180 (Figs. 1 and 2) of any suitable construction is suitably supported on an extension 181 of the end cover and is connected through means hereinafter described, also enclosed within the end cover 170, to the hub 94 for counting the revolutions of the displacement rotor 32. As will be understood the counter 180 preferably is calibrated to indicate the amount of liquid passing through the meter in units of liquid measure, as for example gallons, or weight as for example pounds.

A suitable adapter (not shown) of known construction preferably is provided for adjusting the meter so that it properly indicates the quantity of liquid passing through the meter.

The connection between the hub 94 and the counter includes a counter shaft 190 suitably connected in driving relation with the hub 94 and journaled in a bushing 191 secured in an opening 192 in the cover 170 as by screws 193 the shaft being suitably sealed by a seal 194 and a bearing cover or packing gland 195.

Secured on the outer end of the counter shaft 190 is a bevel gear 196 meshing with a second bevel bear 197 carried on a shaft 198 which is journaled in a bearing 199 suitably secured in a bore 200 in the cover 170 as by a set screw 201.

The shaft 198 is suitably connected (in a manner not shown) in driving relation to the counter (or to the adapter where one is used) whereby upon rotation of the blocking rotor 32 the shaft 198 is rotated to drive the meter and indicate the amount of fluid passing through the meter.

Figure 8:
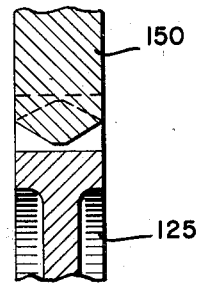
Fig. 8 is a section taken along line 8—8 of Fig. 7.
Figure 5:
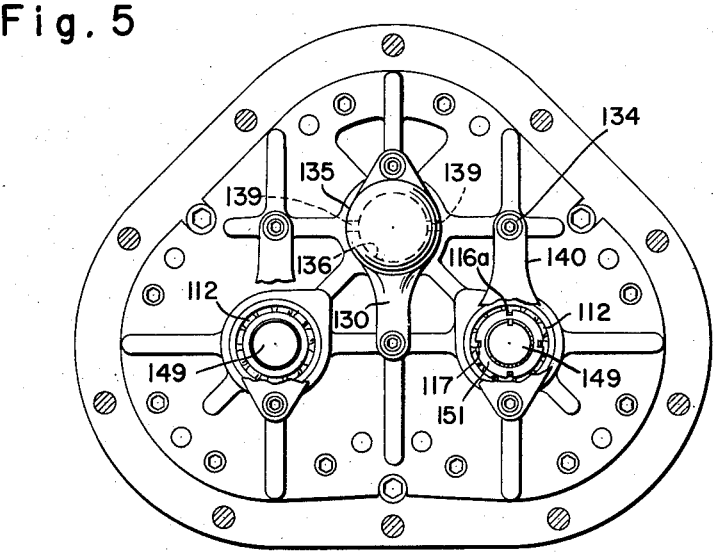
Fig. 5 is a transverse sectional view taken along line 5—5 of Fig. 4.

The gear 125 and pinions 150 preferably are so formed as to decrease the amount of work necessary to move the fluid in and out of the tooth gaps. This feature is of considerable importance when the device of the present invention is employed as a meter. To the foregoing end the teeth of both the gear and the pinions are formed to any suitable conventional tooth shape as for example an involute tooth shape. However, the faces of the gear blank are beveled or chamfered to reduce the tooth addendum at the outer edges as shown particularly in Fig. 8 of the drawings. This permits the liquid to pass in and out of the tooth spaces with the expenditure of a minimum amount of energy inasmuch as the liquid may pass in and out of the gaps not only in a lateral direction but also through the space provided because of the novel shape of the teeth.

When the device is to be used for metering liquids it is connected in the liquid line (not shown) by connecting the inlet 25 and outlet 28 in a liquid line. The flow of liquid through the device causes the displacement rotors 30 and 31 to rotate and since each is connected by the gearing above described in the blocking 32 the latter is rotated at an angular velocity of one-half that of the displacement rotor. The angular relationship between the rotor is maintained throughout the operation of the device.

The operation of the device of the present invention insofar as the general functioning is concerned is similar to that described in the aforesaid Richards application and it is deemed unnecessary to explain the operation in detail. However, I wish to point out that the relative arrangement of the sealing walls and the rotors is such that the seal between each displacement rotor and the blocking rotor is made simultaneously with the seal between the displacement rotor and the corresponding sealing wall. Likewise, the seal between each displacement rotor and the blocking rotor is broken simultaneously with the breaking of the seal between that rotor and the corresponding sealing wall. Moreover the arrangement is such that each displacement rotor is successively in sealing arrangement both with the blocking rotor and with the sealing wal during one-half of its revolution or what may be termed its "displacement" or "working" phase and then is spaced from the casing, the sealing wall and the blocking rotor during the remainder of its revolution or what may be termed its "return" or "non-working" phase. Moreover it will be seen that while each displacement rotor is passing through its displacement phase, the other displacement rotor is passing through its return phase.

In each cycle of the device the displacement rotor 30 first sweeps in sealing relation with the sealing surface 42 and simultaneously is in sealing relation with one of the sealing surfaces of the blocking rotor 32. During this portion of the cycle the displacement rotor 31 is passing through its return phase and is spaced from both its sealing surface on the casing and the blocking rotor 32. During this portion of the rotation three seals are effected, namely between the displacement rotor and the blocking rotor, between the displacement rotor and the sealing surface 42, and between the blocking rotor 32 and the blocking wall 52 and more particularly the end edges of the sealing member 60.

The outlet displacement rotor 31 is arranged in an angular position of 90° from the inlet displacement rotor 30 whereby when the latter completes its working phase the outlet displacement rotor 31 begins its displacement phase and thereafter sweeps in sealing relation with the corresponding sealing wall of the casing and simultaneously is in sealing relation with the blocking rotor 32. During this portion of the cycle the inlet displacement rotor 30 is spaced from both the sealing surface of the casing and from the blocking rotor 32. During the just described second portion of the cycle the blocking rotor 32 is in sealing relation with the blocking wall more particularly one or the other of the sealing elements 60. In this connection it will be noted that the blocking rotor 32 is always in sealing relation with either one or the other of the sealing elements 60 so that no liquid can pass directly from the inlet to the outlet past the blocking rotor and without rotating the displacement rotors.

The device of the present invention when embodied in a meter as shown herein positively measures in an accurate manner the liquid displaced therethrough during each full cycle of operation of the meter or, in fact, during any portion of a revolution of the rotor. The rotation of the blocking rotor operates through the gear and the countershaft to drive the counter. The counter as aforesaid counts the number of revolutions and provides an indication thereof that preferably in terms of volume or weight of liquid displaced during the revolution is counted.

Whenever there is a liquid in the chamber 16 it passes into the spaces between the shoes, namely the spaces 44a, 44b, 49a, 49b, 56a and 56b. Accordingly, any pressure exerted on the liquid in the chamber 16 is similarly exerted on liquid in the chambers behind the shoes. Thus the pressure on both the inner and outer faces of the several shoes is equalized and there is no tendency for the shoes to be distorted by reason of any pressure existing in the liquid within the casing. Thus the sealing surfaces provided by the shoes are maintained in true concentric relation to the respective axis of rotation of the several rotors which pass respectively in sealing relation with the sealing surfaces. Accordingly the seals between the rotors and the sealing surfaces are always maintained at the desired clearance and there is no inequality in the seals and accordingly no leakage past the seals or binding of the relatively sealable sealing surfaces.

It will be seen from the foregoing that my invention provides a rotary positive displacement device for liquids which is simple in construction but which is highly effective in operation. The device is such that when employed as a meter to measure liquid flow it is highly accurate throughout a wide range of different velocities of flow of liquid through the meter.

The provision of the shoes for providing the sealing surfaces which define the displacement cavities and the shoe which provides the blocking surface insures that these surfaces are accurately positioned regardless of the pressure of the liquid in the device. Since there is liquid in the space behind the shoes, the pressure of the liquid passing through the device will not distort the shoes.

The novel mounting of the bearings and the arrangement for adjusting the position of the rotors within the shoe and end plate assembly provides for a convenient and accurate adjustment of the sealing clearance between the end edges of the several rotors and the end plates. It will be seen that each rotor may be adjusted individually relatively to the two end plates so as to equalize the clearances between the end edges of the rotor and the end plates respectively.

Each displacement rotor because of the novel shape is highly effective in measuring liquid which displaces the rotor when the device is being used as a meter and is likewise highly efficient when the device is used to effect the flow of liquid to the device as where it is being used as a pump. It will be noted particularly that the sealing surfaces are shaped so that they are concentric about the axis of rotation of the rotor and consequently are not affected by the flow of liquid. On the other hand the displacement surfaces are so shaped that when the displacement rotor is passing through its return phase the liquid may flow past the rotor with a minimum of restriction or turbulence, and consequently there is a minimum of loss of energy created by the recirculation of the liquid past the displacement rotor.

The arrangement of the several members is such that there is no tendency to compress or draw a vacuum on the liquid as it flows through the meter. Therefore there is no pulsation in the liquid and there is a uniform displacement of liquid during each cycle. It will be noted particularly that the arrangement is such that at the time the inlet displacement rotor moves out of the cavity of the blocking rotor the cavity is not sealed but is open to the chamber 16 and hence no vacuum will be drawn on the liquid by the movement of the inlet displacement rotor. Similarly it will be seen that when the outlet displacement rotor moves into the cavity of the blocking rotor the cavity is open to the outlet chamber and hence there is no compulsion of the liquid by the action of the blade or moving into the cavity.

The meter is of a positive displacement type and there is a minimum of inertia in the moving parts and a minimum of interference with the smooth streamlined flow of liquid through the meter. Accordingly the pressure loss is very low and the meter therefore is highly accurate. Since the blocking rotor rotates in a relatively slow speed the starting inertia of the meter is low, also there is no metal-to-metal contact between the sealing parts and no rubbing friction so that the pressure loss is almost negligible. Moreover the arrangement and shape of the members is such that there is no end thrust thereon.

In the preferred form of the device the inlet and outlet ports are located substantially on opposite sides of the casing and the meter may be readily connected in a liquid conduit or line. On the other hand where the situation makes it desirable the meter may be connected with the inlet and outlet portions arranged at different angles with respect to the casing. The internal arrangement of the meter in the preferred form is such that the liquid flows therethrough without possibly abrupt changes in direction and therefore the flow is streamlined and there is a minimum of interference with the flow through the meter and a minimum of loss due to change in direction of the liquid or prevalence created during flow to the meter.

The construction of the meter is such that it is completely symmetrical and therefore completely reversible. Thus the port designated as the inlet port may be connected to the line so as to be the outlet port vice versa and the liquid caused to drive the meter in the opposite direction from that described. In the case where the meter is used with a conventional counter the latter of course would be reversed in order to obtain a positive reading. However where the counter is reversible the meter can be used in a subtractive manner in which the counter will deduct the amount of reverse flow from any previous positive flow. The meter also may be reversed in respect to its orientation relatively to the line in which it is connected. Where such is desirable the meter may be reversed by merely removing the cover plates, end plates and the parts carried thereby and reassembling all such members with the casing in reversed relation. Moreover, it will be noted that the rotors are so formed that they are individually reversible within the casing. That is each casing may be reversed end for end. Accordingly it is immaterial when the meter is assembled which way the rotors individually are inserted in the shoe and end plate assembly.

The rotors are so arranged that they sweep out of the meter any debris which might be carried in by the incoming fluid. There are no pockets or crevices in which, or obstructions against which, such debris would tend to lodge. It will be noted that the direction of flow of the liquid is such that any debris tends to be carried away from the seals between the members and is not carried into such seals. Moreover the notches formed in the outer edge portions of the displacement rotors provide both relatively sharp edges at the fore-and-aft ends of the sealing surface 104 and pockets adjacent thereto which function to sweep out of the way of the displacement rotors any debris which might otherwise tend to enter the seal between the displacement rotor and its corresponding sealing surface on the casing.

I claim:

1. A rotary, positive, liquid displacement device comprising a hollow casing having side and end walls defining a chamber and having an inlet and an outlet communicating with said chamber, a shoe fixed in said casing and spaced from said side walls to provide a space communicating freely with said chamber, said shoe having a cylindrically arcuate inner sealing surface defining a displacement cavity, a displacement rotor rotatably mounted in said chamber for movement in sealing relation with said cylindrically arcuate sealing surface, and means for blocking the flow of liquid between said inlet and said outlet through said space between said shoe and said casing.

2. A rotary, positive, liquid displacement device comprising a hollow casing having side and end walls defining a chamber and having an inlet and an outlet communicating with said chamber, a shoe fixed in said casing and spaced from said side walls to provide spaces communicating freely with said chamber, said shoe having spaced cylindrically arcuate sealing surfaces, a blocking rotor rotatably mounted in said chamber and having a convex peripheral portion positioned to pass in sealing relation to said cylindrically arcuate sealing surfaces, and means for blocking the flow of liquid between said inlet and said outlet through said spaces between said shoe and said casing.

3. A rotary, positive displacement device for liquids comprising a tubular casing member having an inlet and an outlet communicating with the interior of said casing member, an assembly including a plurality of shoes fixed in said casing member, one of which shoes has a cylindrically arcuate sealing surface defining a displacement cavity and another of which provides a blocking wall, end plates rigidly secured to the ends of said shoes and closing the ends of said casing member, said shoes being spaced from the walls of said casing member to provide spaces communicating freely with the space between said shoes, a displacement rotor rotatably mounted in said end plates in position to pass in sealing relation to said sealing surface, a blocking rotor rotatably mounted in said end plates and having alternate convex and concave peripheral portions, said convex portion positioned to pass successively in sealing relation with said blocking wall and said displacement rotor and said concave peripheral portion positioned to pass in spaced relation to said displacement rotor, means connecting said rotors for simultaneous rotation in a fixed phase relation whereby said displacement rotor is simultaneously in sealing relation to said blocking rotor and then in spaced relation to said displacement rotor, and means for blocking the flow of liquid between said inlet and said outlet through said spaces between said shoes and said casing.

4. A rotary, positive, liquid displacement device comprising a hollow casing having side and end walls defining a chamber and having an inlet and an outlet communicating with said chamber, a plurality of shoes fixed in said casing and spaced from said side walls to provide spaces freely communicating with said chamber, one of said shoes having a cylindrically arcuate sealing surface defining a displacement cavity and another of said shoes providing a blocking wall, a blocking rotor rotatably mounted in said chamber and having a convex peripheral portion positioned to pass in sealing relation to said blocking wall and a concave peripheral portion, a displacement rotor rotatably mounted in said chamber for movement in sealing relation simultaneously with said cylindrically arcuate sealing surface and the convex portion of said blocking rotor and then in spaced relation to said sealing surface and the concave portion of said blocking rotor, means connecting all of said rotors for simultaneous rotation, and means for blocking the flow of liquid between said inlet and said outlet through said spaces between said shoes and said casing.

5. A rotary, positive, liquid displacement device comprising a hollow casing having side and end walls defining a chamber and having an inlet and an outlet communicating with said chamber, a plurality of shoes fixed in said casing and spaced from said side walls to provide spaces freely and constantly communicating with said chamber, one of said shoes providing a blocking wall, and others of said shoes having cylindrically arcuate sealing surfaces defining displacement cavities respectively, a blocking rotor rotatably mounted in said chamber and having a convex peripheral portion positioned to pass in sealing relation to said blocking wall, and a concave peripheral portion, a plurality of displacement rotors each rotatably mounted in said chamber for movement in sealing relation simultaneously with one of said cylindrically arcuate sealing surfaces respectively and the convex portion of said blocking rotor and then in spaced relation to said sealing surface and the concave portion of said blocking rotor, means connecting all of said rotors for simultaneous rotation, and means for blocking the flow of liquid between said inlet and said outlet through said spaces between said shoes and said casing.

6. A rotary, positive, liquid displacement device comprising a hollow casing having side and end walls defining a chamber and having an inlet and an outlet communicating with said chamber, a plurality of shoes fixed in said casing and spaced from said side walls to provide spaces freely and constantly communicating with said chamber, one of said shoes providing a blocking wall, and others of said shoes having cylindrically arcuate sealing surfaces defining displacement cavities respectively, a seal between each of said shoes and said casing extending longitudinally of said shoe for preventing the passage of liquid from the inlet to the outlet through said spaces, a blocking rotor rotatably mounted in said chamber and having a convex peripheral portion positioned to pass in sealing relation to said blocking wall, and a concave peripheral portion, a plurality of displacement rotors each rotatably mounted in said chamber for movement in sealing relation simultaneously with one of said cylindrically arcuate sealing surfaces respectively and the convex portion of said blocking rotor and then in spaced relation to said sealing surface and the concave portion of said blocking rotor, and means connecting all of said rotors for simultaneous rotation.

7. A rotary positive displacement device for liquids comprising a tubular casing member having an inlet and an outlet communicating with the interior of said casing member, a shoe having a cylindrically arcuate sealing surface and fixed in said casing member, end plates rigidly secured to the ends of said shoe respectively and closing the ends of said casing member, means restraining said shoe and end plates against angular movement relatively to the axis of said casing member, the convex side of said shoe in cooperation with a portion of said casing member defining a space in free communication with a chamber on the concave side of said shoe, a rotor disposed in said casing member and journaled in said end plates in position to pass in sealing relation with said shoe, and means for blocking the flow of liquid between said inlet and said outlet through said space between said shoe and said casing.

8. A rotary positive displacement device for liquids comprising a tubular casing member having an inlet and an outlet communicating with the interior of said casing member, a shoe having a cylindrically arcuate sealing surface and fixedly disposed in said casing member, end plates rigidly secured to the ends of said shoe respectively and closing the ends of said casing member, means including pins projecting from the ends of said casing member and slots in said end walls receiving said pins for restraining said shoe and end plates against angular movement relatively to the axis of said casing member, the convex side of said shoe in cooperation with a portion of said casing member defining a space in free communication with a chamber on the concave side of said shoe, a rotor disposed in said casing member and journaled in said end plates in position to pass in sealing relation with said shoe, and means for blocking the flow of liquid between said inlet and said outlet through said space between said shoe and said casing.

9. A displacement rotor for a rotary, positive, liquid displacement device, said rotor having a sealing portion formed with a cylindrically arcuate convex surface concentrically disposed relatively to the axis of rotation of the rotor, a displacement portion on the opposite side of the axis of rotation from said sealing portion and having its faces formed with major portions of convex, arcuate form generally converging in a direction away from the axis and a tip at the outer end of said displacement portion having a convex sealing surface concentric with the axis of rotation, said faces also converging adjacent said axis to provide a narrowed neck position.

10. A displacement rotor for a rotary, positive, liquid displacement device, said rotor having a sealing portion formed with a cylindrically arcuate convex surface concentrically disposed relatively to the axis of rotation of the rotor, a displacement portion on the opposite side of the axis of rotation from said sealing portion and having its faces formed with major portions of convex, arcuate form generally converging in a direction away from the axis, a tip at the outer end of said displacement portion having a convex sealing surface concentric with the axis of rotation, and notches between each of said converging face portions and the convex sealing surface of said tip.

11. A displacement rotor for a rotary, positive, liquid displacement device, said rotor having a sealing portion formed with a cylindrically arcuate convex surface concentrically disposed relatively to the axis of rotation of the rotor, a displacement portion on the opposite side of the axis of rotation from said sealing portion and having its faces formed with major portions of convex, arcuate form generally converging in a direction away from the axis, a concave clearance portion between the inner end of each of said converging face portions and the convex surface of said sealing portion, a tip at the outer end of said displacement portion having a convex sealing surface concentric with the axis of rotation.

12. In a rotary positive displacement device for liquids of the type having a casing, formed with an inlet and an outlet, and a displacement rotor and a cooperating blocking rotor in said casing, the improvement which comprises a driving gear connected to one of said rotors and a driven gear connected to the other of said rotors and meshing with said driving gear, the teeth of both of said gears being tapered from the side edges toward the center at the outer end portions of the teeth.

13. A rotary positive displacement device for liquids comprising a tubular casing member having an inlet and an outlet communicating with the interior of said casing member, end plates closing the ends of said casing member, bearings mounted in said end plates respectively, a rotor having hub portions at its ends journaled in said bearings respectively, at least one of which hub portions has an outwardly facing shoulder abutting one of said bearings, a thrust plate engaging said one bearing, means pivotally connecting said thrust plate to the corresponding end plate at a point at one side of the corresponding hub, and means adjustably connecting said thrust plate on the opposite side of said hub, whereby adjustment of said adjustable connection positions said rotor in an axial direction between said end plates.

References Cited in the file of this patent

UNITED STATES PATENTS

| | | |
|---|---|---|
| 81,778 | Hardy | Sept. 1, 1868 |
| 89,268 | Andrew | Apr. 27, 1869 |
| 363,739 | Frost | May 24, 1887 |
| 367,374 | Deming | Aug. 2, 1887 |
| 1,037,455 | Diefenderfer | Sept. 3, 1912 |
| 1,712,157 | Morita | May 7, 1929 |
| 1,949,723 | Kotelevtseff | Mar. 6, 1934 |
| 2,264,616 | Buckbee | Dec. 2, 1941 |
| 2,495,760 | Pinkel | Jan. 31, 1950 |
| 2,504,230 | Smith | Apr. 18, 1950 |
| 2,540,767 | Tabbert | Feb. 6, 1951 |
| 2,614,503 | Berry | Oct. 21, 1952 |
| 2,694,978 | Berry | Nov. 23, 1954 |

FOREIGN PATENTS

| | | |
|---|---|---|
| 485,876 | Great Britain | May 26, 1938 |